United States Patent [19]

White

[11] 3,976,110
[45] Aug. 24, 1976

[54] REFRIGERANT CHARGING KIT

[76] Inventor: Kenneth R. White, c/o K-Whit Tools, Inc., 5144 E. 65th St., Indianapolis, Ind. 46220

[22] Filed: Jan. 21, 1974

[21] Appl. No.: 435,319

[52] U.S. Cl. .................................. 141/346; 62/77; 62/292; 137/614.05; 141/349; 141/382; 222/402.14; 251/264
[51] Int. Cl.² ........................................ B65B 1/04
[58] Field of Search .............. 62/77, 149, 292, 174, 62/293; 137/614.5, 322, 318; 141/20, 346, 349, 382, 384; 251/264; 222/402.14

[56] References Cited
UNITED STATES PATENTS
1,883,201 10/1932 Wheeler........................ 137/614.05
3,280,879 10/1966 Simms........................... 137/614.05

OTHER PUBLICATIONS
Automotive Accessories & Parts, J. C. Whitney & Co., Catalog No. 286A, 1971, p. 104.

Primary Examiner—Kenneth W. Sprague
Assistant Examiner—Ronald C. Capossela
Attorney, Agent, or Firm—Jenkins, Hanley & Coffey

[57] ABSTRACT

A do-it-yourself kit for charging an automobile air conditioning system. A charging hose has a special delivery fitting to be connected first to the charging nipple on the suction side of the compressor of the operating system. Such fitting has a depressor to open the nipple valve and has a check valve to prevent escape of refrigerant by backflow through the hose. The fitting thus isolates the kit from refrigerant pressure. The charging hose also has an inlet fitting for attachment to the nipple of a pressurized refrigerant can, which has a depressor to open the nipple valve. Refrigerant then flows under can pressure to the system. Unused can refrigerant is saved by disconnecting the fittings in reverse order. Since the hose and kit are isolated from system pressure by the check valve, increased safety is obtained and the hose assembly can be made of low-cost materials which can be discarded after use.

3 Claims, 4 Drawing Figures

REFRIGERANT CHARGING KIT

BACKGROUND OF THE INVENTION

This invention relates generally to apparatus for charging an automobile air conditioning system with refrigerant. More particularly, this invention relates to an improved do-it-yourself charging kit for automobile air conditioners.

Automobile air conditioning systems require periodic servicing to insure that refrigerant in the system is maintained at the proper level for safe and efficient operation. For this reason, valved charging nipples are commonly located at or near both the low pressure suction port and the high pressure discharge port of the system compressor to facilitate the periodic addition of refrigerant through either port into the system.

Do-it-yourself charging kits have been developed to enable an owner to charge his automobile air conditioner with refrigerant himself. Such do-it-yourself kits are only practical for injecting refrigerant into the low pressure suction port of the compressor, since pressures at the high pressure port are too great to be overcome except with special equipment. A do-it-yourself kit should be manufactured from inexpensive materials so that it can be discarded after the refrigerant supply has been expended.

A common do-it-yourself kit comprises a pressurized can containing a supply of refrigerant, a puncture fitting for tapping the refrigerant supply and containing a check valve and a heavy duty hose for delivering refrigerant from the puncture fitting to the low pressure suction port of the compressor. In use, the heavy duty hose is first coupled between the valved puncture fitting and the suction port of the compressor. The puncture fitting is mounted over the top of the pressurized can of refrigerant. The puncture fitting is then operated to pierce a hole in the top of the can to tap the supply of refrigerant, and to seal itself by a gasket to the can to minimize refrigerant leaks. The check valve of the puncture fitting prevents backflow from the hose to the can to protect the can against high pressure backflow from the compressor in the event the system pressure should be greater than the can pressure. This is especially important in the event the hose is mistakenly coupled to the high pressure discharge port of the compressor, since the high pressure at such port could cause the can to explode.

This prior charging kit is relatively expensive, both because the required puncture fitting and check valve is relatively complicated and expensive, and because the arrangement exposes the hose to possible high pressure and therefore requires an expensive high burst-strength hose to meet government safety standards. Such government standards require that the delivery hose be capable of withstanding at least 3.5 times the maximum possible working pressure on the hose. In the event the hose is inadvertently coupled to the high pressure port of the compressor, the hose is subjected to pressures on the high side of the compressor which can reach up to about 350 psi. Consequently, a heavy-duty refrigerant hose having a bursting strength of about 1,750 psi is commonly used. With the prior system, once the pressurized can of refrigerant has been opened by the puncture fitting, any unused refrigerant in the can is wasted because the can cannot be effectively resealed.

The present invention overcomes all the problems and difficulties mentioned above by providing a do-it-yourself charging kit which eliminates the complicated and expensive puncture fitting, utilizes a resealable can of pressurized refrigerant, and isolates both the delivery hose and the pressurized can of refrigerant against backflow from the compressor so that the delivery hose and its fittings can be made of inexpensive materials while providing equal or better safety.

SUMMARY OF THE INVENTION

A charging kit in accordance with the present invention comprises a hose assembly which includes a special delivery fitting to be connected to the valved inlet nipple at the suction side of the compressor of an automobile air conditioning system and which contains both a depressor to open the nipple valve and a check valve to prevent escape or backflow of refrigerant from the system to the hose. The hose assembly is always first connected to the system, before the hose assembly is connected to a refrigerant supply can. The opposite end of the hose assembly carries a simple threaded connector fitting which is subsequently connected to a refrigerant supply can having a valved delivery nipple. The connector fitting has a depressor which operates to open the can nipple valve when the connection is made. The use of the special valved delivery fitting isolates the hose assembly from system pressure and eliminates any danger that the system pressure will be applied to the hose or to the can, even if the fitting is mistakenly applied to the high pressure side of the compressor rather than the intended suction side. This isolation permits using for the delivery hose a relatively inexpensive tubing such as nylon tubing having a bursting strength as low as about 800 psi. It eliminates any necessity for the relatively expensive valved puncture fitting used in previous refrigerant charging kits, and eliminates any necessity for a high-pressure heavy-duty hose between the refrigerant supply and the system being charged. The charging kit is thus of much simpler and less expensive construction than previous kits, yet meets all government safety standards and provides equal or better safety conditions for the user.

BRIEF DESCRIPTION OF THE DRAWINGS

The accompanying drawing illustrates the invention. In such drawings.

DETAILED DESCRIPTION OF THE PREFERRED EMBODIMENT

Figure 1:
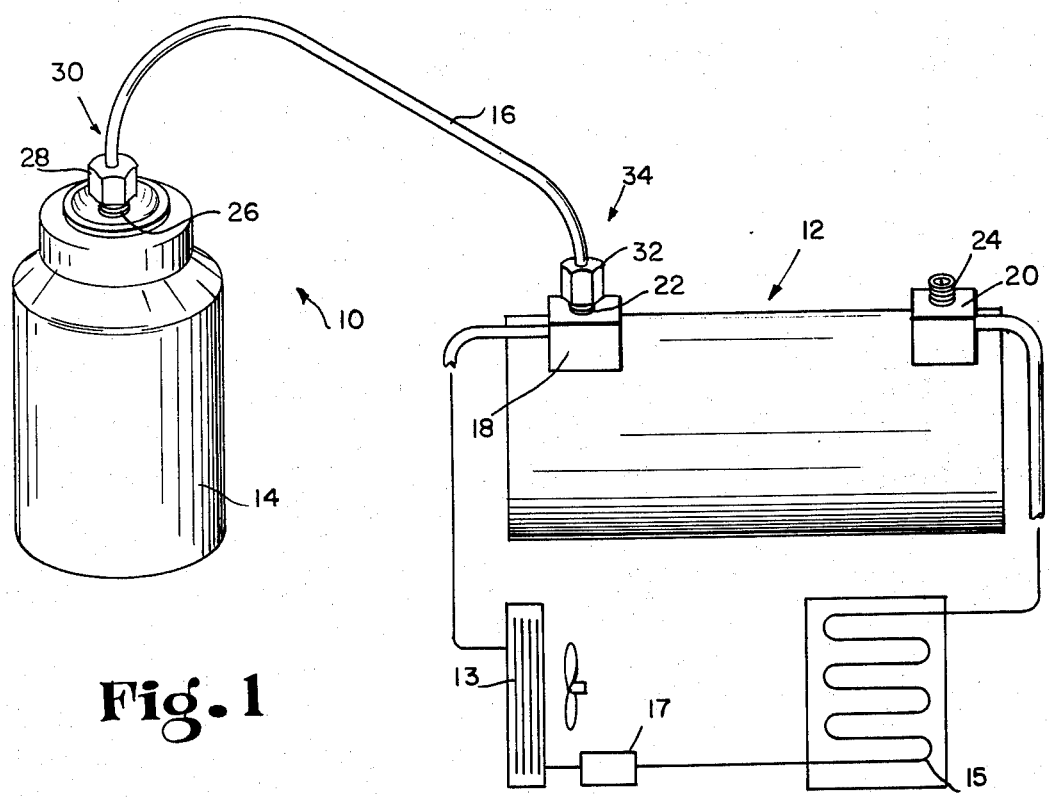
FIG. 1 is a perspective view of a do-it-yourself charging kit embodying the invention, connected to the charging nipple at the low pressure suction port of an automobile air conditioning system compressor.

A do-it-yourself charging kit 10 for charging an automobile air conditioning system with refrigerant is shown in FIG. 1 coupled to the compressor 12 of such an air conditioning system. The kit 10 generally comprises a pressurized can 14 of refrigerant, and a delivery hose 16 having fittings at its ends for connecting the can 14 to the compressor 12 for the delivery of refrigerant to the system.

The compressor 12 is the component of a conventional automobile air conditioning system which compresses refrigerant gas for cycling through the system. Refrigerant gas flows from an evaporator 13 into the compressor 12 through its suction port 18. The refrigerant gas is compressed and exits from the compressor 12 through its discharge port 20 and is delivered to a condenser 15 where the high pressure gas is cooled and converted to liquid form. The refrigerant is then cycled through an expansion valve 17 back to the evaporator 13 where the refrigerant is again vaporized, all in a well known manner.

The compressor 12 is normally provided with valved access nipples 22 and 24 at or near the suction port 18 and the discharge port 20, respectively, to permit refrigerant to be added to the system through either port to thereby maintain refrigerant in the system at the proper level for safe and efficient operation. The valves of such nipples have stems centered in the nipples which can be depressed to open the valves.

Pressures developed by the compressor during normal operation commonly vary from about 20–40 psi at the compressor suction port 18 to about 110–350 psi at the compressor discharge port 20. Charging kits must contain refrigerant pressurized to a higher pressure than that developed by the compressor at the desired port of injection in order to overcome the pressure in the system. Therefore, a do-it-yourself charging kit of this invention is coupled as shown in FIG. 1 to the low pressure suction port 18 of the compressor 12 because of the substantially lower pressures at that port.

Figures 2, 3:
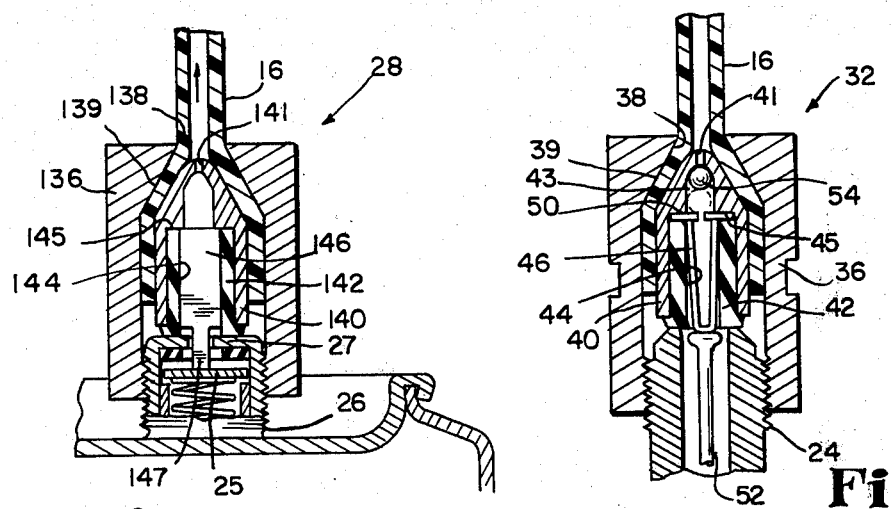
FIG. 2 is an enlarged section of the hose delivery fitting in accordance with the invention, connected to the valved compressor nipple, with the check valve of the fitting shown closed in full lines and open in dotted lines.
FIG. 3 is a section of a hose inlet fitting connected to the valved nipple of the refrigerant can.

The can 14 contains a pressurized supply of refrigerant such as that known as R-12 and sold by the DuPont Corporation under the trademark Freon-12. The can 14 preferably has a conventional valved nipple 26 in its top for delivery of the refrigerant from the can. As shown in FIG. 3, such nipple contains a valve disc 25 which closes with pressure against an annular gasket seated against the end wall 27 of the nipple 26 and which can be opened by a depressor thrust downward through the outlet opening in that end wall 27.

The delivery hose 16 interconnects the pressurized can 14 and the compressor 12, and may be formed of a light-weight and inexpensive plastic material such as nylon tubing of 1/4 inch outside diameter. A connector fitting 28 is mounted on the can end 30 of the hose 16 and is adapted to open the valve of the nipple 26 on the can 14 when coupled therewith. A special fitting 32 is mounted on the compressor end 34 of the hose 16. This is adapted to open the valve of the compressor nipple 22 when coupled therewith, and contains a check valve which prevents escape or backflow of refrigerant from the compressor. When the connector fittings 32 and 28 are respectively coupled with the compressor nipple 22 and the can nipple 26, refrigerant will flow out of the pressurized can 14 through the delivery hose 16 and into the compressor 12 to thereby charge the air conditioning system with refrigerant.

The special connector or fitting 32 for the compressor end of the hose 16 is shown in section in FIG. 2. This comprises an outer sleeve 36 of brass or the like, which may be of hexagonal outer shape as shown or may be knurled. This is formed with an end opening 38, a conical internal surface 39 diverging from the end opening, and a cylindrical internal surface at the large end of the conical surface. The end of the cylindrical surface is internally threaded to engage with the compressor nipple 22. The hose tube 16 extends into the end opening and substantially to the threaded portion of the sleeve 36. A bullet-shaped plug or insert 40 of brass or the like is pressed into the open end of the tube 16 and expands the tube substantially into contact with the cylindrical surface of the sleeve. The insert has a conical end or nose portion which lies within the conical surface 39 of the sleeve, with the tube forming a flared portion disposed between the nose and such conical surface. Axial thrust on the insert 40 will clamp the tube in this position, and the tube will seal the plug to the sleeve. The plug 40 desirably has an outside diameter at least equal to and desirably larger than the outside diameter of the tube, so as to expand the tube to form a flared portion 39 of substantial radial extent to be clamped between the conical surfaces of the plug 40 and the sleeve 36. In one embodiment a 1/4 inch nylon tube was expanded with a plug or insert 40 of 21/64 inch outside diameter.

Figure 4:
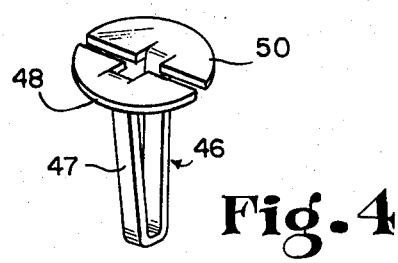
FIG. 4 is an isometric view of the depressor used in the hose delivery fitting to open the valve of the charging nipple.

The bullet-shaped plug 40 has a small opening 41 in its conical inner end. This leads to an enlarged bore 43 which terminates at a shoulder 45 which extends outward to a cylindrical side wall extending to the opposite end of the plug. A hollow cylindrical insert 42 of rubber or the like, having a longitudinal passage 44, is snugly fitted within the open end of the plug 40. A depressor 46 extends loosely through the passage 44 and is held in place by a head lying between the inner end of the insert 42 and the shoulder 45 of the plug. The depressor is desirably shaped as shown in FIG. 4, with an elongated U-shaped stem portion 47 connected at its ends to outward-bent, semi-circular head portions 48 and 50.

The rubber insert 42 is of such length that when the sleeve 36 is threaded onto the compressor nipple 22, the lower end of the insert 42 engages the top of the nipple 22 to form a seal between the plug 40 and the nipple 22. The insert 40 is also thrust axially by such engagement on the nipple, and this clamps the tube between the insert 40 and the sleeve 36. Also, when the fitting 36 is tightened down over the nipple 22, the depressor 46 engages and depresses the valve plunger 52 to open the nipple valve.

As shown in FIG. 2, a check ball 54 is disposed loosely within the bore 43 of the plug 40, and is held therein by the head of the depressor 46. The upper end of the bore 43 forms a valve seat at the end of the hole 41, and the ball 54 seats against such seat as a check valve to seal the plug 40 against flow through the connector 32 from the nipple 22 to the hose 16, i.e. in an upward direction as shown in FIG. 2, but to permit free flow in the opposite direction. When the can 14 is connected through the hose 16 to the compressor nipple 22, refrigerant will flow out of the can 14 through the hose 16, and through the fitting 32 and nipple 22 into the compressor suction port 18. Such flow carries the check ball 54 downward away from the opening 41 as shown in dotted lines in FIG. 2. The check ball does not seal the opening 48 in the pin head 50 and permits free flow through the connector 32. However, should the compressor pressure become greater than the can pressure, backflow out of the compressor into the hose 16 and the can 14 is prevented as the check ball 54 is carried upward to closed position as shown in full lines in FIG. 2, to close the flow passage against reverse flow through the connector 32. The connector 32 and its check valve 54 thus isolate the hose 16 and the can 14 from back pressure exceeding the normal charging pressure of the refrigerant can.

The connector fitting 28 at the other end of the tube 16 is shown in FIG. 3. Like the fitting of FIG. 2, this comprises an outer sleeve 136, formed with an end opening 138, an internal conical surface 139, and a cylindrical side wall. The side wall is threaded at the bottom open end for engagement with the threaded can nipple 26. Within the sleeve 136, the tube 16 is expanded by a bullet shaped plug 140. Such plug is identical with that of FIG. 2, and has a small hole 141 at its upper end and a downward facing shoulder 145 intermediate its length, but does not contain a check ball. A cylindrical rubber insert 142 is received in the cylindrical open end of the plug 140 and extends beyond such plug to form a seal against the end face of the nipple 26. A depressor 146 is held within the insert 141. This depressor 146 is a flat stamping having a wide upper end which bears against the shoulder 145 and lies diametrically across the passage 144 in the insert 142 and is tightly held therein. The lower end of the depressor is a narrow tongue 147 which extends through the outlet opening of the nipple end wall 27 and presses the valve 25 off its seat.

In using the do-it-yourself charging kit of this invention, the compressor connector fitting 32 is first coupled to the compressor nipple 22 at the suction port 18 of the air conditioning system compressor 12. The depressor 46 depresses the system 52 of the valve in that nipple, to open the valve, but the check ball 54 disposed within the compressor connector 32 prevents refrigerant within the system from escaping to or through the hose 16. In the event refrigerant is discharged through the hose 16, this is an indication that the check ball 54 is not working properly and should be corrected before proceeding with the charging operation.

After the connection fitting 32 is properly connected to the compressor nipple 22, and the check ball 54 is properly preventing backflow from the compressor 12 into the hose 16, the can connector 28 is coupled to the nipple 26 on the pressurized can 14 of refrigerant. Such coupling opens the valve of that nipple 26 and the contents of the pressurized can 14 will then flow through the plug 14 and the hose 16 and into the air conditioning system through the charging nipple 24 at the compressor suction port 18.

In the event the hose 16 is mistakenly coupled to the wrong compressor port, that is, to the high pressure discharge port 20 of the compressor instead of the low pressure suction port 18, refrigerant will not flow through the hose, since the discharge port pressure is substantially greater than the pressure in the can of refrigerant. However, the check ball 54 will close the flow passage through the compressor connector 32 and will prevent backflow of high-pressure refrigerant from the compressor 12 into the can 14. To correct the mistake, the operator should first disconnect the connector fitting 28 from the can 14 to allow the can valve 25 to close and should then disconnect the connector fitting 32 from the compressor. He can then reconnect the kit in the proper way to the suction port nipple 22.

A do-it-yourself charging kit of this invention has several advantages over kits previously available. One important advantage is that the one-way check valve 54 in the connector 32 protects both the delivery hose 16 and the can 14 against possible backflow from the system, especially in the event the hose 16 is mistakenly coupled to the high pressure discharge port 20 of the compressor 12. This allows an inexpensive low-pressure delivery hose 16 to be safely used. Since the delivery hose 16, as well as the pressurized can 14, is protected at all times against backflow from the compressor, the maximum possible working pressure on the delivery hose 16 is the pressure of the refrigerant can 14, rather than the maximum compressor pressure. The can pressure is much lower and can be controlled by the manufacturer, and government requirements for a hose bursting strength of 3.5 times the maximum hose working pressure can be met with an inexpensive nylon tubing having a bursting strength of as low as about 800 psi.

Another advantage is that a charging kit of this invention utilizes a pressurized can of refrigerant having a valved nipple connection which permits the can to be resealed, whereas previous kits used a puncture valve fitting to open the can and such puncture valves do not permit the can to be positively resealed. With the present invention, an operator can use only a portion of the refrigerant in the pressurized can, and can save the remaining portion for later use. Moreover, the previously used puncture valve is entirely eliminated from the kit and this greatly reduces the cost.

I claim:

1. A do-it-yourself charging kit for charging an automobile air conditioning system comprising: a pressurized can containing a supply of refrigerant; a delivery hose for connecting the can to the system; a delivery connector on the hose for first fixedly coupling one end of said delivery hose to the air conditioning system, said connector containing a one-way valve closing in the direction of flow from the connector to the hose so as to permit refrigerant flow into the system from said delivery hose but to prevent backflow from the system into said delivery hose, and means for subsequently coupling the other end of said delivery hose to said can and adapted to open said can when coupled therewith to permit the contained refrigerant to flow outward therefrom through said delivery hose and into the system under the can pressure, wherein said delivery connector comprises an outer sleeve having an end opening, a conical internal surface diverging from said end opening, and a cylindrical internal surface at the large end of the conical surface, a hose tube extending into said opening, through said conical portion and at least partially into said cylindrical portion, a bullet-shaped insert having a conical nose pressed into the end of the hose tube, expanding the same into a flared portion between the conical surface and the nose of said insert, the sleeve being internally threaded for reception on a nipple, the insert being arranged to be thrust axially by the nipple to clamp the flared portion of the tube between the nose of the insert and the conical surface of the sleeve.

2. A hose connector as in claim 1 with the addition of a restricted orifice in the end of the bullet-shaped insert, a check ball contained within the nose of the insert and movable against the inner end surface of the said insert to form a check valve therein, and means to retain the ball within the insert.

3. A hose connector as in claim 1 with the addition of a depressor mounted within the said insert and having a head and stem, the head thereof being engaged against a shoulder in the insert and the stem thereof extending into and axially of the threaded end of the sleeve to depress the stem of a valve in a nipple onto which the connector is threaded.

* * * * *